United States Patent
Fukushima et al.

(10) Patent No.: US 7,551,239 B2
(45) Date of Patent: Jun. 23, 2009

(54) VIEWING ANGLE CONTROL ELEMENT AND IMAGE DISPLAY BASED ON SAME

(75) Inventors: Hiroshi Fukushima, Yamatokoriyama (JP); Koji Yabuta, Kashiba (JP); Tomoo Takatani, Nara (JP); Masakazu Wada, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 682 days.

(21) Appl. No.: 11/046,731

(22) Filed: Feb. 1, 2005

(65) Prior Publication Data

US 2005/0174529 A1    Aug. 11, 2005

(30) Foreign Application Priority Data

Feb. 5, 2004    (JP)    ............... 2004-029428

(51) Int. Cl.
G02F 1/1335    (2006.01)
G02B 27/00    (2006.01)

(52) U.S. Cl. .................. 349/16; 349/196; 359/613

(58) Field of Classification Search ............ 349/16, 349/196; 359/613
See application file for complete search history.

(56) References Cited

U.S. PATENT DOCUMENTS

| | | | |
|---|---|---|---|
| 5,825,436 A * | 10/1998 | Knight | 349/16 |
| 5,936,596 A | 8/1999 | Yoshida et al. | |
| 6,211,930 B1 * | 4/2001 | Sautter et al. | 349/66 |
| 6,842,170 B1 * | 1/2005 | Akins et al. | 345/173 |
| 2002/0024355 A1 | 2/2002 | Suzuki et al. | |
| 2002/0047965 A1 | 4/2002 | Suzuki et al. | |

FOREIGN PATENT DOCUMENTS

| | | |
|---|---|---|
| JP | 6-59287 A | 3/1994 |
| JP | 6-105305 A | 4/1994 |
| JP | 9-73070 A | 3/1997 |
| JP | 9-105907 A | 4/1997 |
| JP | 9-244010 A | 9/1997 |
| JP | 10-197844 A | 7/1998 |
| JP | 10-319384 A | 12/1998 |
| JP | 11-174489 A | 7/1999 |
| JP | 2003-288025 A | 10/2003 |
| WO | 01/88605 A2 | 11/2001 |

* cited by examiner

Primary Examiner—Michael H Caley
(74) Attorney, Agent, or Firm—Nixon & Vanderhye P.C.

(57) ABSTRACT

A viewing angle control element of the present invention contains transparent regions 23 having a transmittance T1 and light shield regions 24 capable of switching between a transmittance T2 and a transmittance T3 which is less than T1 and T2 according to an external signal. Each of the transparent regions 23 and the light shield regions 24 is positioned opposite to one of pixels. Displays are produced at or close to the original brightness of the image display element in wide viewing angle mode, whereas in narrow viewing angle mode, light transmission is limited to achieve narrow viewing angles. This is in contrast with other viewing angle control elements which produce displays at or close to the original brightness of the image display element in narrow viewing angle mode, whereas in wide viewing angle mode, light is diffused or otherwise modified to achieve wide viewing angles. Thus, the viewing angle control element is capable of achieving both wide viewing angles and narrow viewing angles, and still preventing image quality deterioration at wide viewing angles due to decreased brightness of the image display element.

11 Claims, 9 Drawing Sheets

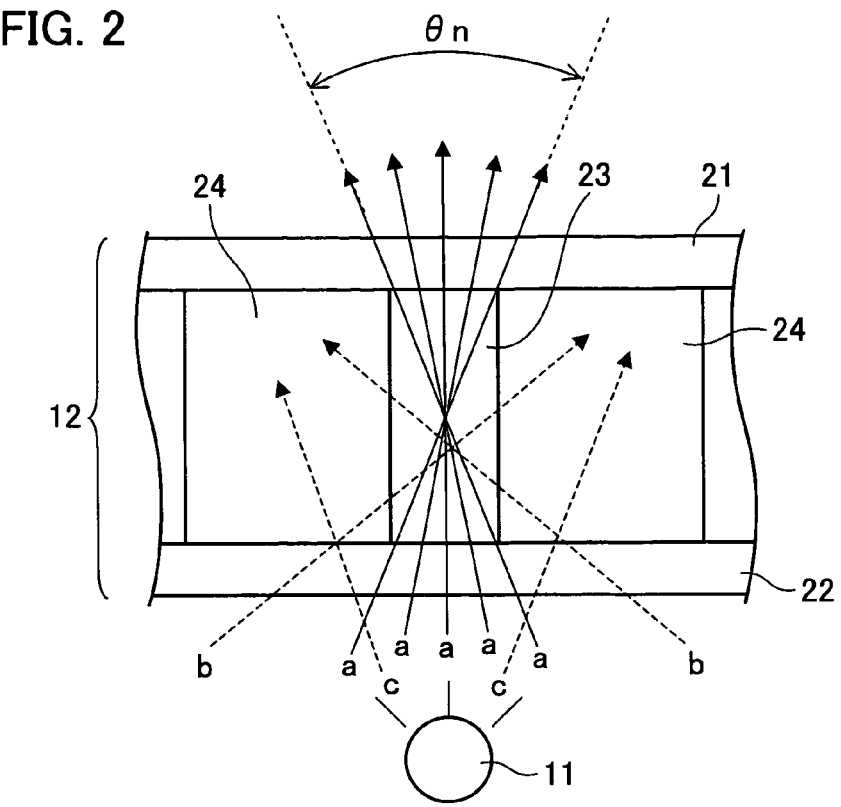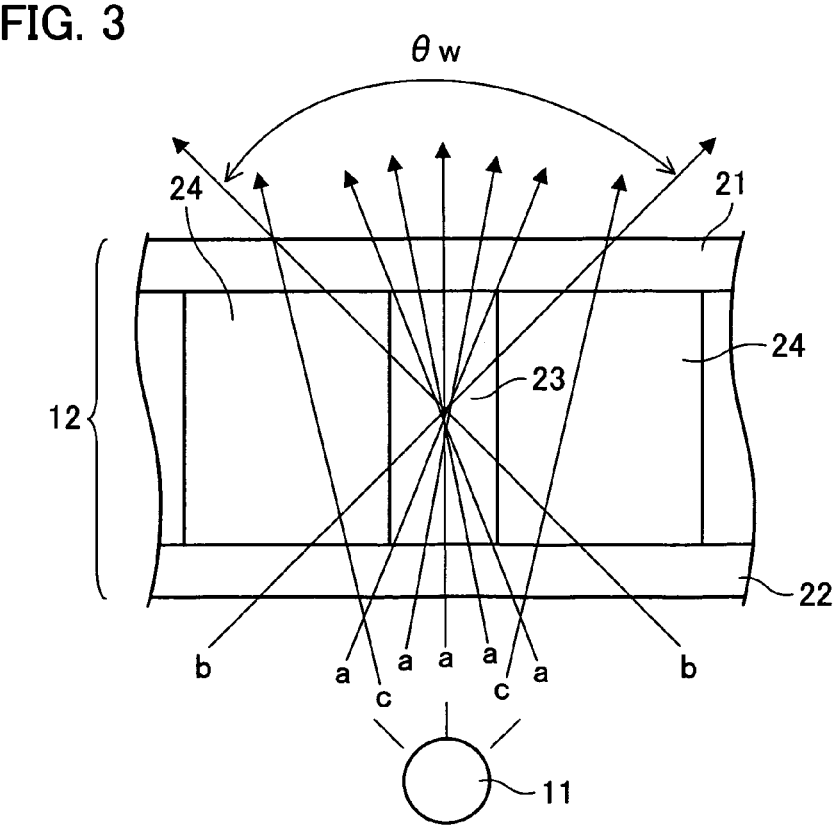

VIEWING ANGLE CONTROL ELEMENT AND IMAGE DISPLAY BASED ON SAME

This Nonprovisional application claims priority under 35 U.S.C. § 119(a) on Patent Application No. 2004-029428 filed in Japan on Feb. 5, 2004, the entire contents of which are hereby incorporated by reference.

FIELD OF THE INVENTION

The present invention relates to viewing angle control elements switching an image display between wide viewing angle mode and narrow viewing angle mode. The invention also relates to image displays, based on the element, the viewing angles of which are controllable.

BACKGROUND OF THE INVENTION

Liquid crystal displays have been enjoying great popularity. Taking advantage of their features-slimness, low weight, and low power consumption, they are achieving rapidly growing use in various fields, not to mention mobile applications.

Mobile phone applications are especially notable. The slimness, low weight, and low power consumption features have been enhanced. On top of that, the liquid crystal display now boasts excellent visibility owing to improvements in high definition technology. These factors are fueling explosive and widespread popularity of the liquid crystal device in the field.

Improvements have been also made on viewing angle expansion films and in wide viewing angle technology based on the use of vertical alignment mode and IPS (in-plane switching) alignment mode. The achievements are applied in, among others, those fields where two or more people are expected to watch the screen together: for example, car navigation systems, notebook computers, monitors, and liquid crystal televisions. A recent trend is the rapidly growing use of the large screen liquid crystal television.

It is undoubtedly a benefit of the wide viewing angle technology that the image on the liquid crystal display has become viewable by many people. Meanwhile, current development in IT technology has enabled the user to obtain and view various information at various public places. People other than the user can view graphic information on the image display primarily made from the liquid crystal display. The protection of privacy over the image is a serious issue. Solutions must be offered as soon as possible.

The following will describe conventional liquid crystal displays. A typical liquid crystal display includes a pair of transparent electrode substrates positioned face to face. Pixel electrodes are provided in a matrix. Also provided are active elements such as thin film transistors which are switching means selecting the pixel electrodes which apply voltage to liquid crystal.

In the space between the pair of transparent electrode substrates, a liquid crystal layer is formed. Conventionally used liquid crystal layer alignment modes are twisted nematic alignment mode ("TN") and super twisted nematic alignment mode ("STN"). In addition, vertical alignment mode ("VA") and in-plane switching ("IPS") are widely employed in recent liquid crystal displays with very wide viewing angles.

Incidentally, the aforementioned liquid crystal displays, especially, those with very wide viewing angles employing VA mode or IPS mode, have very wide viewing angles as shown in FIG. 11. Images are recognizable to viewers B other than the primary viewer A who is right in front of the liquid crystal display plane. The displays are suitable for many viewers watching together.

However, the wide viewing angle of the liquid crystal display poses a problem: the other viewers B can view the graphic information that the primary viewer A does not want the other viewers B to view. To provide only the primary viewer A with desired graphic information while preventing the other viewers B from peeking at the information, the viewing angles need be narrowed down deliberately.

The viewing angle mode needs be switched between this wide viewing angle mode for many viewers watching together and a narrow viewing angle mode where the viewing angles are narrow for the purpose of protecting privacy, depending on the needs of the user of the liquid crystal display. Wide viewing angle mode and narrow viewing angle mode need be switchably implemented on the same display.

In an attempt to address the problem, Japanese published patent application 9-105907/1997 (Tokukaihei 9-105907; published on Apr. 22, 1997) discloses a technique for the liquid crystal display of which the viewing angle is controllable. The liquid crystal display is capable of switchably implementing wide viewing angle mode and narrow viewing angle mode.

Next, the disclosed technique will be briefly described.

FIG. 12 and FIG. 13 show schematic drawings of the viewing-angle-controllable liquid crystal display. In the figures, there is provided an image display 13 displaying desired graphic information to viewers. The image display 13 includes multiple pixels arranged in a matrix. Each pixel is capable of individually modulating/controlling light from a backlight unit 11 placed behind the image display 13.

In the space between the image display 13 and the backlight unit 11 is there provided an optical element 90 controlling the viewing angle. The optical element 90 includes a pair of transparent electrode substrates positioned face to face. The space between the substrates is filled with a polymer-dispersed liquid crystal. The liquid crystal scatters or transmits light from backlight 11 according to electric signals. The scattering is controlled by means of voltage applied to the pair of transparent electrodes of the optical element 90.

The backlight unit 11 is adapted so that its brightness can be set to a given level through control of voltage applied to a cold cathode fluorescent tube which is a part of the unit.

First, the low viewing angle mode will be described in reference to FIG. 12. In the mode, the brightness of the backlight unit 11 is lowered by reducing the power supply to the backlight unit 11. Simultaneously, the drive voltage for the optical element 90 is set to a predetermined value, so that the polymer-dispersed liquid crystal does not scatter any light at all.

In this situation, light from the backlight unit 11 passes through the optical element 90 as shown in the figure. The scattering property of the transmitted light does not change at the optical element 90. The light leaves the image display 13 within the angle θn as in the figure. The narrow viewing angle of the viewing-angle-controllable liquid crystal display is substantially equal to the viewing angle of the image display 13.

When other viewers are to be blocked from the graphic information before the viewing-angle-controllable liquid crystal display, there is no need for a wide viewing angle. The purpose is purportedly achieved by the use of the liquid crystal display in the narrow viewing angle mode.

Next, the wide viewing angle mode will be described in reference to FIG. 13.

In the wide viewing angle mode, the brightness of the backlight unit 11 is raised by increasing the power supply to the backlight unit 11. Simultaneously, the drive voltage for the optical element 90 is set to a lower value than the predetermined value, so that the polymer-dispersed liquid crystal scatters increased quantities of light.

In this situation, light from the backlight unit 11 is scattered by the polymer-dispersed liquid crystal in the optical element 90 as shown in the figure. The light passes through and leaves the image display 13 within the angle θw in the figure. The light from the backlight 11 reaches the image display 13 after being diffused by the optical element 90. The viewing angle of the viewing-angle-controllable liquid crystal display is greater than the viewing angle of the image display 13.

When two or more people are to watch the liquid crystal display together, the liquid crystal display needs to exhibit a wide viewing angle. This wide viewing angle mode is hence useful.

Controlling the optical scattering of the optical element 90 which contains a polymer-dispersed liquid crystal as a viewing-angle-controlling element by means of drive voltage in this manner can purportedly achieve switching between the narrow viewing angle mode and the wide viewing angle mode.

In the technique described in the document, the polymer-dispersed liquid crystal is provided across the entire display area. The optical scattering is regulated through application voltage to regulate the viewing angle.

In the narrow viewing angle mode, a predetermined voltage is applied to the optical element containing a polymer-dispersed liquid crystal to prevent the scattering of light from the backlight so that the viewing angle of the image display element is used for the narrow viewing angle as it is. It is impossible to narrow the viewing angle of the image display.

Current mainstream liquid crystal modes are vertical alignment, IPS, and other modes where the viewing angles are very wide. This is especially true from large- to medium-size notebook computers and monitors to mobile applications. In the foregoing technology whereby the viewing angles in narrow viewing angle mode correspond to the viewing angles of a liquid crystal panel for image displays, the narrow viewing angle mode can no longer be achieved.

Further, in the wide viewing angle mode, the optical scattering by the optical element 90 containing a polymer-dispersed liquid crystal is exploited to expand the viewing angles. Therefore, if the optical scattering is increased for viewing angle expansion, the reflectance of the optical element for the light from the backlight unit increases, and the transmittance decreases. The falling transmittance in turn decreases the brightness of a liquid crystal panel used for display purposes. Image quality thus drops.

In addition, when viewing displays on a liquid crystal display element in typical situations, a use environment where an image with wide viewing angle characteristics is used as an ordinary screen and the narrow viewing angle mode is used according to a situation is considered common. It is therefore a problem for the falling brightness to degrade image quality in the wide viewing angle mode as described above.

SUMMARY OF THE INVENTION

The present invention has an objective to provide a viewing angle control element which achieves both wide and narrow viewing angles while preventing the falling brightness of the image display element from degrading the image quality in the wide viewing angle. Another objective is to provide an image display based on the element.

To achieve the objectives, a viewing angle control element in accordance with the present invention is placed between a light source and a viewer to switch an image display between wide viewing angle mode and narrow viewing angle mode. The element is characterized in that it contains: first regions having a transmittance T1; and second regions capable of switching between a transmittance T2 and a transmittance T3 which is less than T1 and T2. The element is also characterized in that each of the first and second regions is positioned opposite to one of pixels.

According to the arrangement, when the second regions have switched to the transmittance T2, light (a flux of light from a pixel) corresponding to an image passes through the first and second regions, thereby producing a wide viewing angle display.

When the second regions have switched to the transmittance T3, the light passes through the first regions at the same brightness as the second regions have switched to the transmittance T2. Meanwhile, the light passes through the second regions at decreased brightness (the light is possibly completely blocked). In this situation, the image is invisible to the viewer who is away from the position where the light having passed through the first regions is visible (when the light is completely blocked). Even if the image is visible, the image appears dark and difficult to recognize. Narrow viewing angle displays are thus achieved.

In other words, displays are produced at or close to the original brightness of the image display element in wide viewing angle mode, whereas in narrow viewing angle mode, limit transmission is limited to achieve narrow viewing angles. This is in contrast with other angle control elements which produce displays at or close to the original brightness of the image display element in narrow viewing angle mode, whereas in wide viewing angle mode, light is diffused or otherwise modified to achieve wide viewing angles. Thus, the image display element is capable of producing displays at or close to the original brightness of the image display element in wide viewing angle mode. The element can also prevent decreased brightness of the image display element in wide viewing angle mode. Thus, the image display element is capable of achieving both wide viewing angles and narrow viewing angles, and still preventing image quality deterioration at wide viewing angles due to decreased brightness of the image display element.

The viewing angle control element in accordance with the present invention, arranged as in the foregoing, is further characterized in that T1 is equal to T2.

According to the arrangement, T1 is equal to T2. Therefore, the element achieves those effects which are achieved by the foregoing arrangement, and is also capable of producing uniform displays in wide viewing angle mode.

The viewing angle control element in accordance with the present invention, arranged as in the foregoing, is further characterized in that the second regions achieve a transmittance T3 through absorption.

According to the arrangement, the second regions achieve a transmittance T3 through absorption. Therefore, the element achieves those effects which are achieved by the foregoing arrangement, and also has a simple structure.

The viewing angle control element in accordance with the present invention, arranged as in the foregoing, is further characterized in that the second regions are a guest-host liquid crystal containing a dichroic dye.

According to the arrangement, the second regions are a guest-host liquid crystal containing a dichroic dye. Therefore, the element achieves those effects which are achieved by the foregoing arrangement, and also has a simple structure.

The viewing angle control element in accordance with the present invention, arranged as in the foregoing, is further characterized in that the second regions achieve the transmittance T3 through scattering.

According to the arrangement, the second regions achieve the transmittance T3 through scattering. Therefore, the element achieves those effects which are achieved by the foregoing arrangement, and also has a simple structure.

The viewing angle control element in accordance with the present invention, arranged as in the foregoing, is further characterized in that the second regions are a polymer-dispersed liquid crystal.

According to the arrangement, the second regions are a polymer-dispersed liquid crystal. Therefore, no polarizer is needed. Therefore, the element achieves those effects which are achieved by the foregoing arrangement, and also has a simple structure.

The viewing angle control element in accordance with the present invention, arranged as in the foregoing, is further characterized in that two or more of the first regions are provided at a position opposite to each one of the pixels so that each of the first regions determines a viewing angle and that a sum area of the two or more of the first regions determines brightness.

According to the arrangement, two or more of the first regions are provided at a position opposite to each one of the pixels so that each of the first regions determines a viewing angle and that a sum area of the two or more of the first regions determines brightness.

For example, if two or more stripe-like first regions are provided for each pixel, narrow viewing angles can be achieved by narrowing down the individual stripes. If there is only one stripe-like first region, the transmissive area falls with the progress of the narrowing of the viewing angle, which inevitably results in darker displays (less brightness). If there are two or more stripe-like first regions, the transmissive area can be increased, because the transmissive area is determined as a whole. This prevents undesirable dark displays.

Therefore, the element achieves those effects which are achieved by the foregoing arrangement, and is also capable of preventing image quality deterioration due to dark displays while increasing the range where the transmittance can be reduced.

The viewing angle control element in accordance with the present invention, arranged as in the foregoing, is further characterized in that the first regions are of a stripe shape.

According to the arrangement, the first regions are of a stripe shape. This facilitate patterning in forming the first regions. Therefore, the element achieves those effects which are achieved by the foregoing arrangement, and also allows for simple manufacturing steps.

The viewing angle control element in accordance with the present invention, arranged as in the foregoing, and is also characterized in that the first and second regions are lined up parallel to horizontal lines.

According to the arrangement, the first and second regions are lined up parallel to horizontal lines. Therefore, the element achieves those effects which are achieved by the foregoing arrangement, and also enables narrow viewing angles in the left/right directions.

The viewing angle control element in accordance with the present invention, arranged as in the foregoing, and is further characterized in that the first and second regions are lined up both parallel and perpendicular to horizontal lines.

According to the arrangement, the first and second regions are lined up both parallel and perpendicular to horizontal lines.

For example, the first regions and the second regions are a mosaic.

Therefore, the element achieves those effects which are achieved by the foregoing arrangement, and also enables narrow viewing angles in the up/down and left/right directions.

An image display in accordance with the present invention operates in wide viewing angle mode and narrow viewing angle mode. The image display is characterized in that it is capable of switching between wide viewing angle mode and narrow viewing angle mode by means of any one of the foregoing viewing angle control elements.

According to the arrangement, the image display switches between wide viewing angle mode and narrow viewing angle mode by means of the viewing angle control element. Thus, the image display element is capable of producing displays at or close to the original brightness of the image display element in wide viewing angle mode. The element can also prevent decreased brightness of the image display element in wide viewing angle mode. Thus, the image display is capable of achieving both wide viewing angles and narrow viewing angles, and still preventing image quality deterioration at wide viewing angles due to decreased brightness of the image display element.

For a fuller understanding of the nature and advantages of the invention, reference should be made to the ensuing detailed description taken in conjunction

BRIEF DESCRIPTION OF THE DRAWINGS

FIG. 2 is a cross-sectional view illustrating display principles of a viewing angle control element in accordance with the present invention when the viewing angle is narrow.

FIG. 3 is a cross-sectional view illustrating display principles of a viewing angle control element in accordance with the present invention when the viewing angle is wide.

FIG. 6(a) is a plan view, and FIG. 6(b) is a cross-sectional view.

FIG. 7(a) is a plan view, and FIG. 7(b) is a cross-sectional view.

FIG. 8(a) is a plan view, and FIG. 8(b) is a cross-sectional view.

FIG. 9(a) is a plan view, and FIG. 9(b) is a cross-sectional view.

FIG. 10(a) is a plan view, and FIG. 10(b) is a cross-sectional view.

DESCRIPTION OF THE EMBODIMENTS

Embodiment 1 will be described assuming that the invention is applied to a transmissive liquid crystal display. The invention is however applicable to light emitting elements such as plasma displays and EL (electroluminescence) displays. Also, the present invention is applicable to both the color display and the black and white display.

Figure 1:
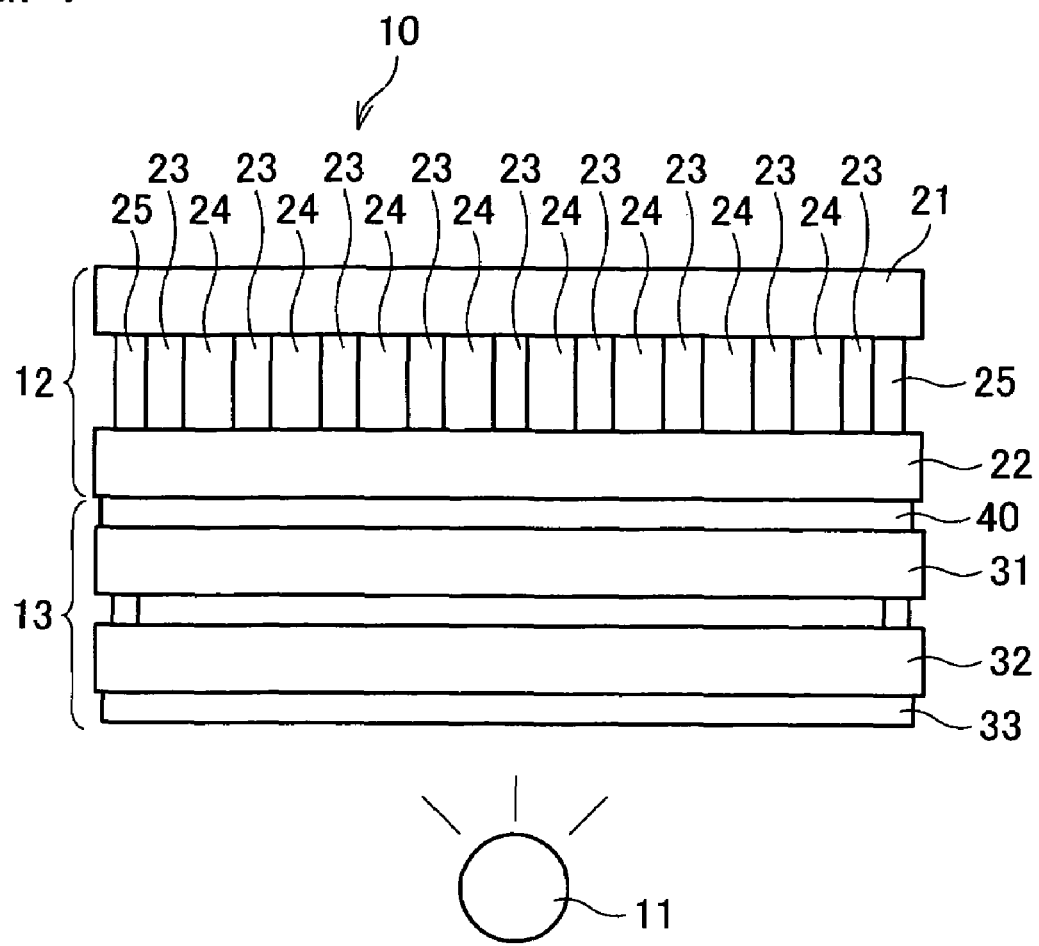
FIG. 1 is a cross-sectional view illustrating, as an example, the structure of an image display in accordance with the present invention.

FIG. 1 is a schematic cross-sectional view illustrating an image display based on a viewing angle control element of the present embodiment. An image display 10 of the present embodiment includes a viewing angle control element 12, an image display element 13, and a backlight unit (light source) 11. The viewing angle control element 12 has a viewing angle control function. The image display element 13 is positioned behind the viewing angle control element 12 (opposite from the viewer throughout this document). The backlight unit (light source) 11 is positioned behind the image display element 13. In the present embodiment, the image display element 13 is a liquid crystal display element. However, this is by no means intended to be limiting the invention. Any other image display element could be used.

The viewing angle control element 12 includes an upper substrate 21 and a lower substrate 22. The upper and lower substrates 21, 22 are a pair of transparent electrode substrates made of, for example, glass which contains transparent electrodes. Each substrate has an alignment film (not shown) on a surface opposing the other substrate. The alignment film is subjected to an alignment step where necessary.

The viewing angle control element 12 has transparent regions (first regions) 23 and light shield regions (second regions) 24 in a space between the upper substrate 21 and the lower substrate 22. The transparent region 23 contains a pillared transparent resin layer which transmits light from the backlight unit 11. The light shield regions 24 absorbs or scatters (hereinafter, "blocks") light from the backlight unit 11.

The transparent region 23, which is a pillared transparent resin layer, has a function as a spacer, retaining a constant space between the upper substrate 21 and the lower substrate 22.

25 is an edge sealing material.

The image display element 13 includes an upper substrate 31, a lower substrate 32, and a polarizers 40, 33. The upper and lower substrates 31, 32 are a pair of transparent electrode substrates made of, for example, glass which contains transparent electrodes. The polarizers 40, 33 are attached to completely cover the front surface and the back surface, respectively, of the combined upper and lower substrates 31, 32. The polarizer 40 intervenes combining the lower substrate 22 of the viewing angle control element 12 to the upper substrate 31 of the image display element 13.

In the present embodiment, the viewing angle control element 12 sits before the image display element 13. However, the image display element 12 and the image display element 13 may be transposed. For example, the image display element 13, the viewing angle control element 12, and the backlight unit 11 may be arranged in this order as viewed from the viewer.

Possible combinations of the viewing angle control element 12 and the image display element 13 include:

(1) The light shield regions 24 are formed of a guest-host liquid crystal containing dichroic dye. The image display 13 is a liquid crystal element or another element which requires the use of a polarizer.

(2) The light shield regions 24 are formed of a guest-host liquid crystal containing dichroic dye. The image display 13 is an EL element or another light emitting element which requires no polarizer.

(3) The light shield regions 24 are formed of a polymer-dispersed liquid crystal. The image display 13 is a liquid crystal element or another element which requires the use of a polarizer.

(4) The light shield regions 24 are formed of a polymer-dispersed liquid crystal. The image display 13 is an EL element or another light emitting element which requires no polarizer.

No polarizer 40 needs be provided in the space if, as in (4), the light shield regions 24, constituting parts of the liquid crystal layer of the viewing angle control element 12, are formed of a polymer-dispersed liquid crystal and the image display 13 is a light emitting element which requires no polarizer.

A polarizer 40 is needed between the viewing angle control element 12 and the image display element 13 in (1) through (3). In any case, only one polarizer is required there.

The transparent region 23 has a transmittance T1. Each light shield region 24 is capable of switching between a transmittance T2 and a transmittance T3 according to a viewer instruction. T3 is smaller than T1 and T2 due to absorption and scattering. T1 may be equal to T2. Under these conditions, displays are produced with improved uniformity when the viewing angle is wide. Where necessary, T1 and T2 may be specified in a design process so that T1<T2 or T1>T2. T1 and T2 may be 100%. T3 may be 0. With this switching capability, the image display 10, when viewed as a whole, can switch between (1) a state where some regions have a transmittance T1 and others a transmittance T2 and (2) a state where some regions have a transmittance T1 and others a transmittance T3. The former is the wide viewing angle mode. The latter is the narrow viewing angle mode. By default, the image display 10 operates in the former mode. When the viewer does not want other people to view the image from oblique angles, the viewer can set the image display 10 to the latter mode so that only the viewer can view a clear image.

Figure 6:
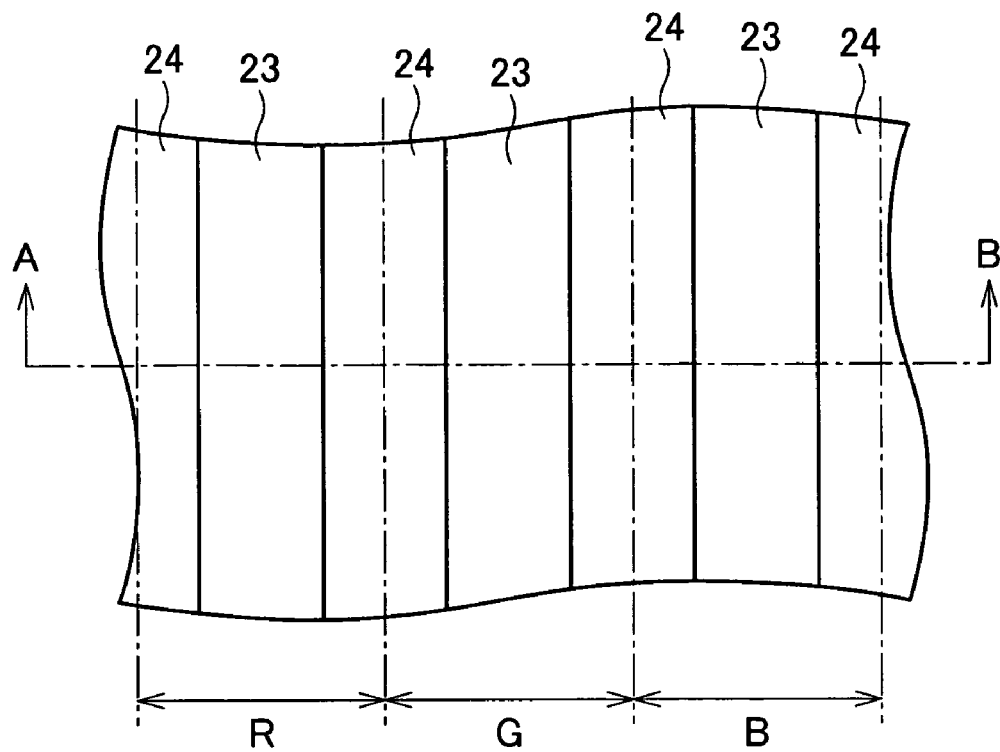
FIG. 6(a) and FIG. 6(b) show examples of patterns in first and second regions of a viewing angle control element in accordance with the present invention.
Figure 6:
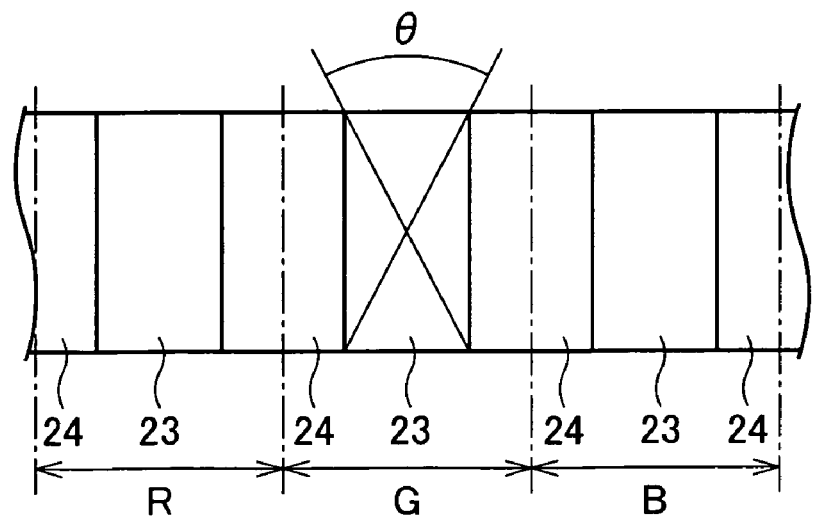
Figure 7:
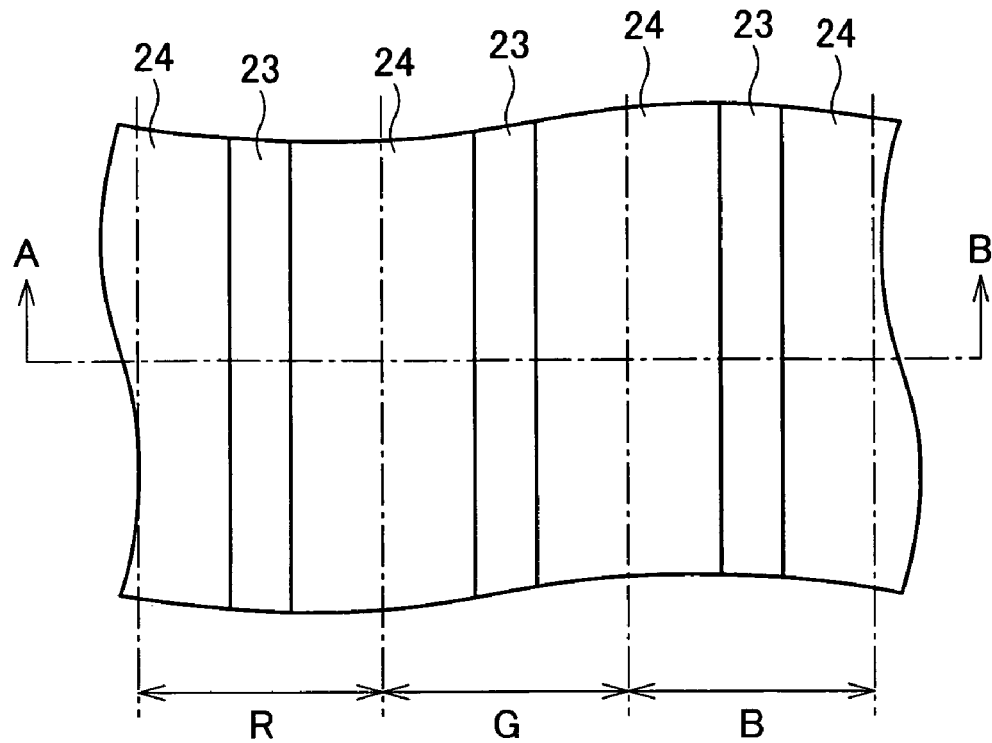
FIG. 7(a) and FIG. 7(b) show examples of patterns in first and second regions of a viewing angle control element in accordance with the present invention.
Figure 7:
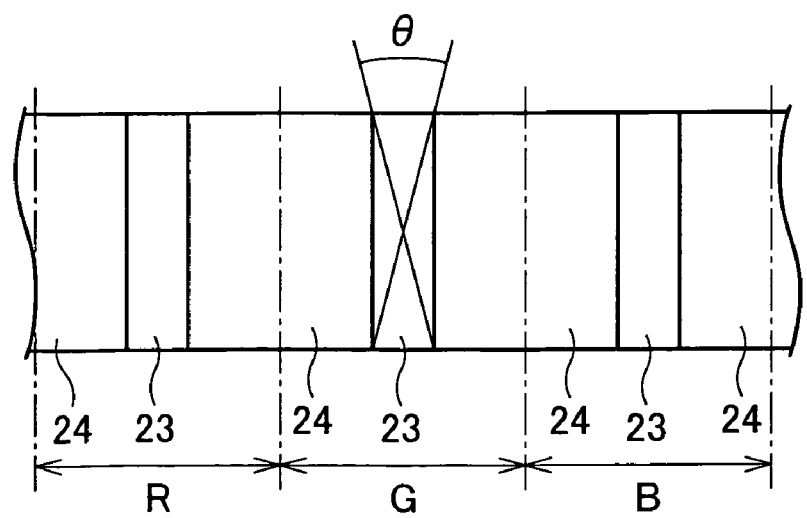
Figure 8:
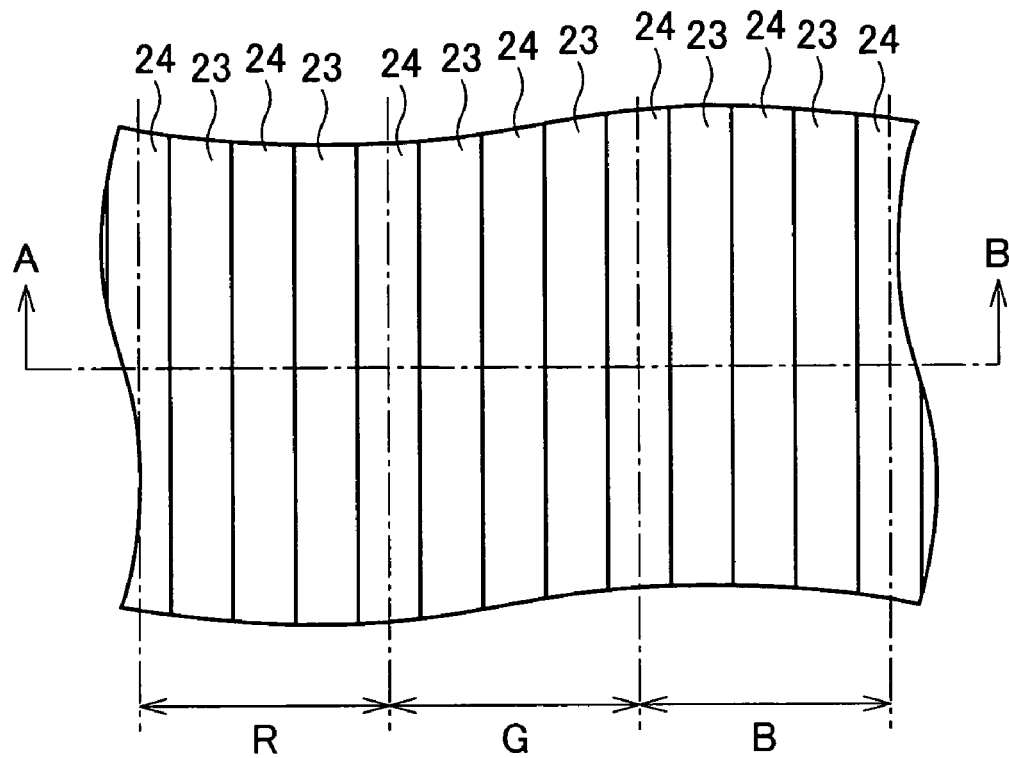
FIG. 8(a) and FIG. 8(b) show examples of patterns in first and second regions of a viewing angle control element in accordance with the present invention.
Figure 8:
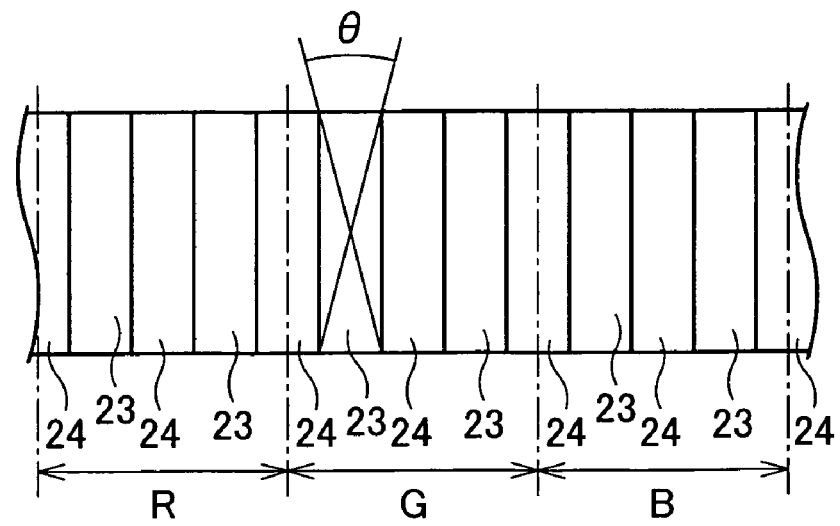

The transparent regions 23 in the viewing angle control element 12 may be arranged in various patterns. One of possibilities is shown in FIG. 6(a). The pattern is drawn as viewed normal to the display screen of the image display 10, that is, as viewed from the viewer. The up, down, left, and right directions on FIG. 6(a) correspond to those on the display screen of the image display 10. FIG. 6(a) shows R (red), G (green), and B (blue) columns in a pixel provided from left to right. FIG. 6(b) is a horizontal cross-section of the display screen of the image display 10. Likewise, FIGS. 7(b), 8(b), 9(b), and 10(b) are horizontal cross-sections of the display screens of an image displays 10 shown in FIGS. 7(a), 8(a), 9(a), and 10(a) respectively.

The example in FIGS. 6(a), 6(b) show the transparent regions 23 stretching vertically like stripes. Each region 23 covers a group of pixels (not shown) that align vertically on the display screen (top/bottom direction in FIG. 6(a)). Each area covering a pixel is divided into three subareas. The subarea in the middle is a part of the transparent region 23. The left and right subareas, in terms of the horizontal direction on the display screen (left/right direction in FIG. 6(a)), are parts of the light shield regions 24. In other words, each pixel is divided into three subareas. The subarea in the middle is opposite the transparent region 23. The left and right subareas, in terms of the horizontal direction on the display screen, are opposite the light shield regions 24.

The stripe-like shape of the transparent regions 23 allows for easy patterning in the fabrication of the transparent regions 23 and the light shield regions 24. This will contribute to the streamlining of manufacturing steps.

The transparent regions 23 and the light shield regions 24 are lined up parallel to horizontal lines. This arrangement allows for reductions of the viewing angle in the left/right direction on the screen.

FIGS. 7(a), 7(b) show another pattern with the transparent regions 23 narrower than those in FIGS. 6(a), 6(b). This setting of the width (of the slits) allows for any control of the viewing angle.

FIGS. 8(a), 8(b) show another pattern. This is different from the one shown in FIGS. 7(a), 7(b) where multiple transparent regions 23 cover each pixel. Here, there are two stripe-shaped transparent regions 23 covering each pixel. The transparent region 23 has the same width as in FIGS. 7(a), 7(b). In other words, there exist multiple transparent regions 23 (here, two transparent regions 23) at a location opposite each pixel. Thus, the individual transparent regions 23 determine the viewing angle, and the sum area of the multiple (here, two) transparent regions 23 for one pixel determines the transmittance.

In this manner, when the transparent region 23 is narrow, more transparent regions 23 are provided for each pixel so as to allow greater quantities of light to reach the viewer from the pixel. Brightness is thus improved without changing the viewing angle. In this example, the transparent region 23 has a stripe-like shape. Alternatively, the transparent region 23 may be, for example, a mosaic, and the brightness is still adjustable through the increase/decrease of the number of transparent regions 23 covering one pixel in the same manner.

Figure 9:
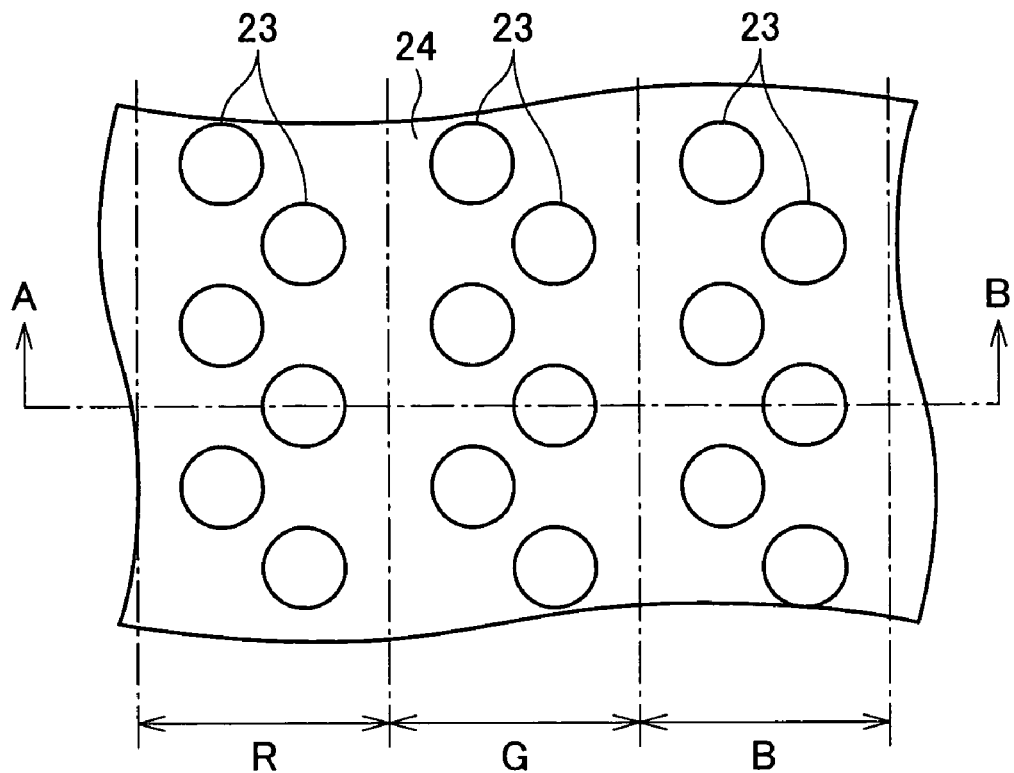
FIG. 9(a) and FIG. 9(b) show examples of patterns in first and second regions of a viewing angle control element in accordance with the present invention.
Figure 9:
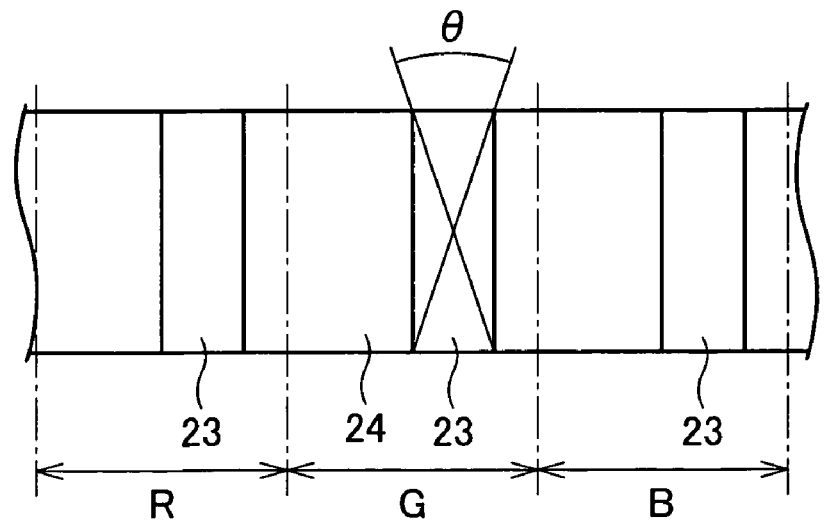

FIGS. 9(a), 9(b) show a dot pattern (mosaic), which is different from the slit patterns (stripe-like patterns) in FIGS. 6(a)-8(b).

In this case, the transparent regions 23 and the light shield regions 24 are lined up both parallel and perpendicular to horizontal lines. The arrangement allows for control in the up/down directions as well as control in the left/right directions on the display screen. This is because the FIG. 9(a) pattern appears the same in the cross-section, whether horizontal or vertical, as long as the per-pixel arrangement of the transparent regions 23 and the light shield regions 24 is concerned. FIG. 9(b) is a horizontal cross-section of the FIG. 9(a) pattern.

Figure 10:
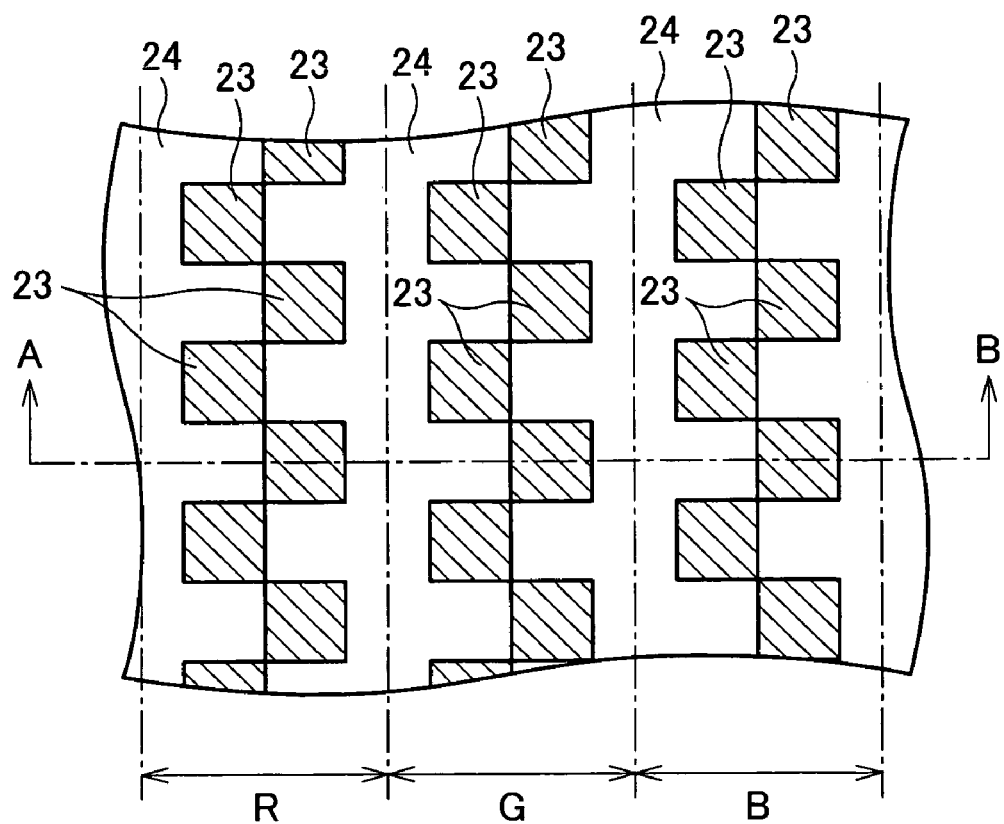
FIG. 10(a) and FIG. 10(b) show examples of patterns in first and second regions of a viewing angle control element in accordance with the present invention.
Figure 10:
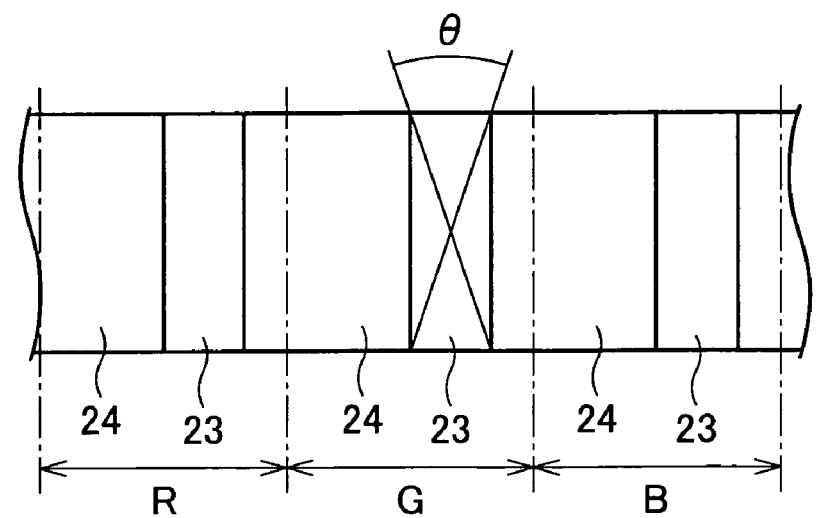
Figure 11:
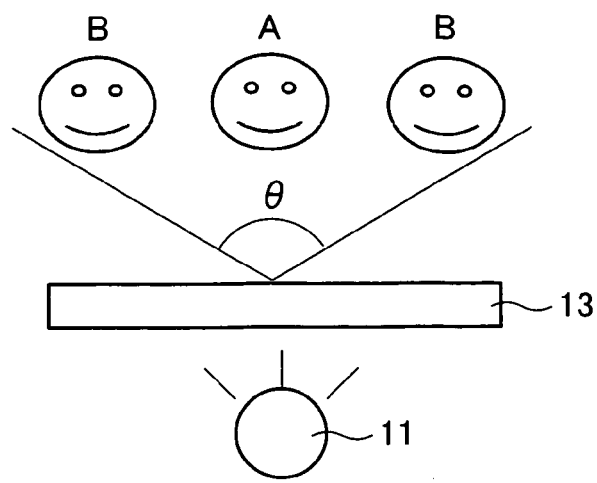
FIG. 11 is a drawing showing the viewing angle characteristics of a conventional viewing angle control element.
Figure 12:
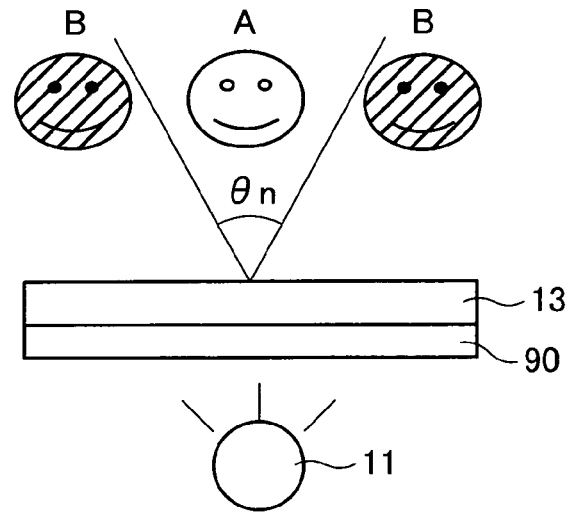
FIG. 12 is a drawing showing a conventional viewing angle control element when the viewing angle is narrow.
Figure 13:
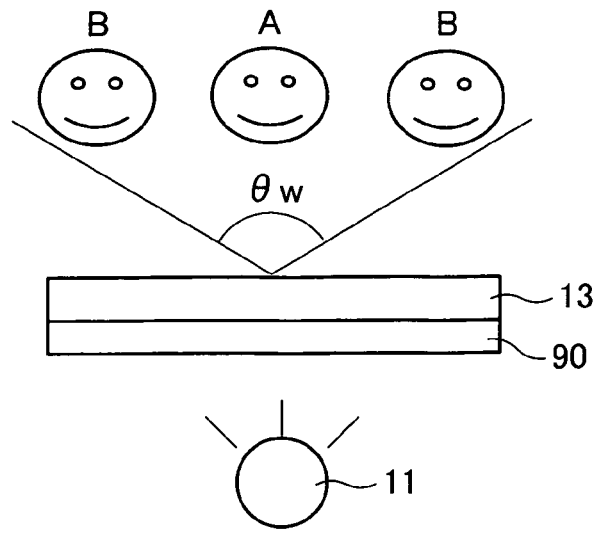
FIG. 13 is a drawing showing a conventional viewing angle control element when the viewing angle is wide.

The transparent regions 23 are round in the example in FIGS. 9(a), 9(b). Alternatively, the transparent regions 23 may be quadrilateral. FIGS. 10(a), 10(b) show the dot pattern in FIGS. 9(a), 9(b) in which the transparent regions 23 are however changed to quadrilaterals. This arrangement also allows for control in the up/down directions as well as control in the left/right directions on the display screen.

Now, referring to FIG. 2 and FIG. 3, principles in producing displays on the image display of the present embodiment will be described. In the present embodiment, the image display is built from a guest-host liquid crystal containing dichroic dye in the light shield region 24 and operates in guest-host mode.

FIG. 2 is an enlarged cross-sectional view of the image display of the present embodiment, illustrating principles in producing displays in narrow viewing angle mode using a guest-host mode in which a dichroic dye is dispersed in the liquid crystal layer as the light shield regions 24. Display principles will be described in reference to FIG. 2.

The liquid crystal layer provided in the light shield regions 24 includes a p-type dichroic dye dispersed in a nematic liquid crystal which exhibits positive permittivity anisotropy. The liquid crystal layer shows a homogeneous alignment where the molecules align homogeneously in an in-plane direction of the substrate.

Light traveling from the backlight unit 11 enters the image display 13 containing the liquid crystal display and is linearly polarized by the polarizer 40 in the image display 13, before it enters the viewing angle control element 12. Of the light beams incident to the transparent region 23 which is a pillared transparent resin layer in the viewing angle control element 12, beams (a) within the angle θn (see the figure) leave the viewing angle control element 12, unaffected by the light shield regions 24.

Meanwhile, beams (b) outside the angle θn (see the figure) pass through the transparent region 23 including the pillared transparent resin layer 3 and inevitably enter the light shield regions 24 including a liquid crystal layer in which dichroic dye is dispersed. The light shield regions 24 include dichroic dye which absorbs light polarized in a particular direction. Those beams outside the angle θn are absorbed by the dichroic dye because the beams, upon leaving the image display element 13, are polarized parallel to the direction of alignment of the nematic liquid crystal containing the dichroic dye.

Beams (c), directly entering the light shield regions 24 in the viewing angle control element 12, are all absorbed by the dichroic dye in the light shield regions 24 at whatever incident angle, similarly to the beams (b).

In short, among the linearly polarized beams incident to the viewing angle control element 12, only the beams (a), which hit the transparent region 23 at incident angles up to θn, can pass through the element 12. The other beams (b) and (c) are blocked.

Therefore, the viewing angle for the light incident to the viewing angle control element 12 can be rendered equal to θn under control by the viewing angle control element 12. Thus, the image display can operate in narrow viewing angle mode.

FIG. 3 is enlarged cross-sectional view of the image display of the present embodiment, illustrating principles in producing displays in wide viewing angle mode. Display principles will be described in reference to FIG. 3.

The liquid crystal layer provided in the light shield regions 24 is, as mentioned earlier, a nematic liquid crystal with positive permittivity anisotropy in which p-type dichroic dye is dispersed. When a predetermined voltage is applied, the layer shows a vertical alignment where the major axes of the molecules are parallel to the electric field. Therefore, the major axes of the dichroic dye molecules are perpendicular to the polarization planes of all beams incident to the viewing angle control element 12. The dichroic dye hence does not absorb the polarized light.

The operator, or the viewer, can apply or remove the predetermined voltage through the operation of a predetermined switch (not shown) on the image display 10, depending on whether he/she wants to set the display to wide viewing angle mode or narrow viewing angle mode. The arrangement of such a switch is well known and readily modified where necessary; no description is given here.

No light absorption by the dichroic dye occurs in the light shield regions 24 in the presence of applied voltage. No light absorption of course occurs in the transparent regions 23. As a result, the beams (a), (b), (c) incident to the viewing angle control element 12 are not affected by the viewing angle control element 12. The beams leave the viewing angle control element 12, retaining their viewing angle characteristics. Thus, the image display operates in wide viewing angle mode where the viewing angle is greater than in narrow viewing angle mode.

Thus, the viewing angle control element 12 of the present embodiment is capable of switching the dichroic dye in the liquid crystal layer in the light shield regions 24 between two states through a suitable setting of the voltage applied to the light shield regions 24 in the viewing angle control element 12. Light traveling from the backlight unit 11 and entering the light shield regions 24 in the viewing angle control element 12 is absorbed in one of the states and transmitted in the other state. The switching results in a change in the diffusion of the light upon leaving the viewing angle control element 12 and allows for the control of the viewing angle characteristics.

Embodiment 2

Next, referring to FIG. 4 and FIG. 5, principles in producing displays on the image display of the present embodiment will be described. In the present embodiment, the light shield regions 24 are formed of a polymer-dispersed liquid crystal.

Figure 4:
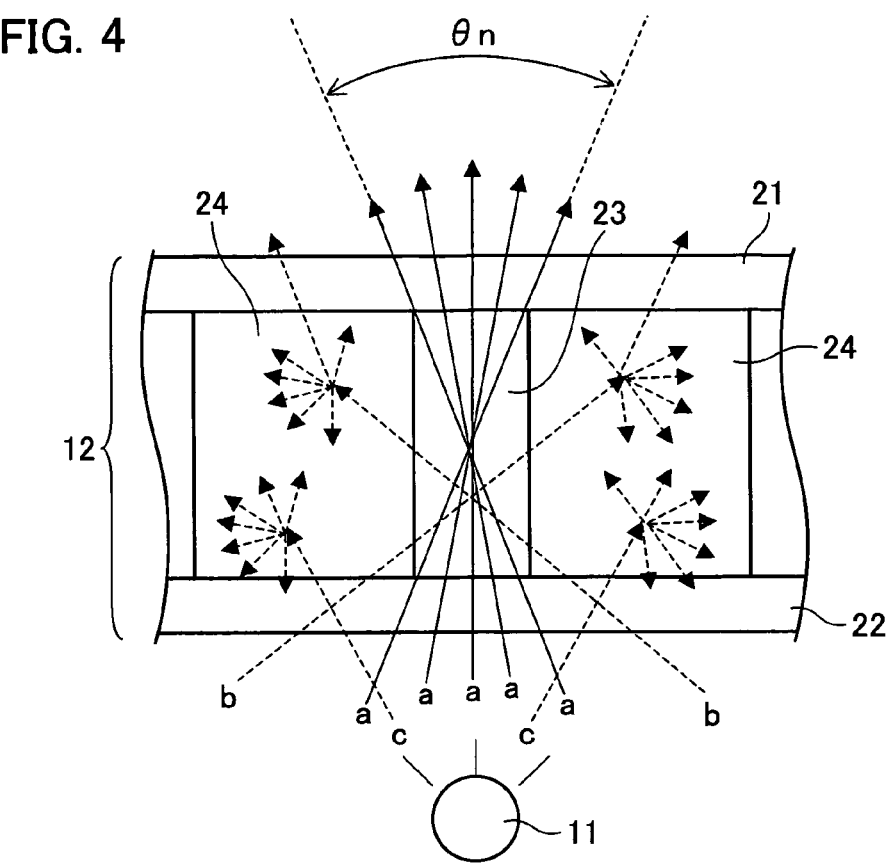
FIG. 4 is a cross-sectional view illustrating display principles of a viewing angle control element in accordance with the present invention when the viewing angle is narrow.

FIG. 4 is an enlarged cross-sectional view of the image display of the present embodiment, illustrating principles in producing displays in narrow viewing angle mode. Display principles will be described in reference to FIG. 4.

Light, upon entering the viewing angle control element 12, is diffused, but not polarized. Of the light beams incident to the transparent region 23 which is a pillared transparent resin layer in the viewing angle control element 12, beams (a) within the angle θn (see the figure) leave the viewing angle control element 12, unaffected by the polymer-dispersed liquid crystal provided in the light shield region 24.

Meanwhile, relatively highly diffused beams (b) outside the angle θn (see the figure) pass through the transparent region 23 and inevitably enter the light shield regions 24 including the polymer-dispersed liquid crystal. Here, the polymer-dispersed liquid crystal has an optical scattering property with respect to incident light. Therefore, light beams outside the angle θn are scattered by the polymer-dispersed liquid crystal. The scattering results in limiting the transmittance for the light leaving the viewing angle control element 12.

Beams (c), directly entering the light shield regions 24 in the viewing angle control element 12, are scattered by the polymer-dispersed liquid crystal in the light shield regions 24 at whatever incident angle. The scattering results in limiting the transmittance for the light leaving the viewing angle control element 12.

In short, of the non-polarized, diffused beams incident to the viewing angle control element 12, only the beams (a), which hit the transparent region 23 at incident angles up to θn, can pass through the element 12 without being interrupted by the polymer-dispersed liquid crystal. The transmittance for the beams (b) outside that incident angle is limited to relatively low values. The beams (c), directly entering the light shield regions 24 containing the polymer-dispersed liquid crystal, are of course all scattered. The scattering results in limiting the transmittance to relatively low values. Hence, the beams (a) passing through the transparent region 23 within the angle θn account for a dominant portion of the light passing through the viewing angle control element 12.

Therefore, the viewing angle for the light incident to the viewing angle control element 12 can be rendered equal to θn under control by the viewing angle control element 12. Thus, the image display can operate in narrow viewing angle mode.

Figure 5:
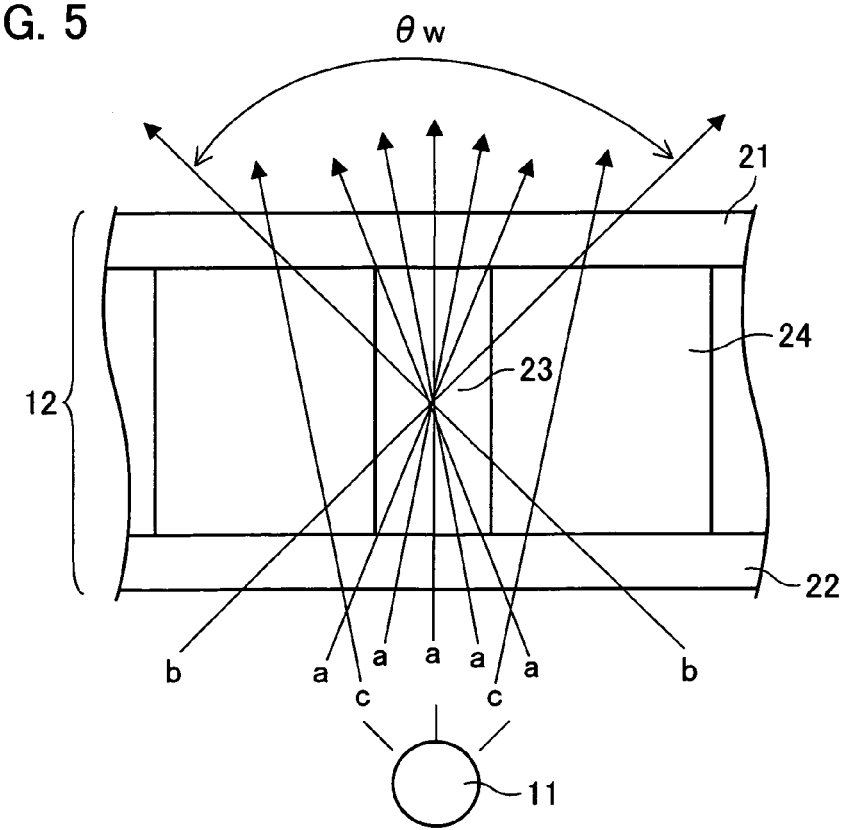
FIG. 5 is a cross-sectional view illustrating display principles of a viewing angle control element in accordance with the present invention when the viewing angle is wide.

FIG. 5 is an enlarged cross-sectional view illustrating principles in producing displays on the image display of the present embodiment in viewing angle mode. Display principles will be described in reference to FIG. 5.

The liquid crystal layer provided in the light shield regions 24, as mentioned earlier, includes the polymer-dispersed liquid crystal. The liquid crystal layer scatters incident light in the absence of applied voltage, whereas under a predetermined applied voltage, the major axes of the molecules align with the electric field, that is, vertical alignment state. Thus, the polymer-dispersed liquid crystal loses the scattering property. The beams (b), (c) therefore enter and pass through the liquid crystal layer.

Therefore, no scattering of light by the polymer-dispersed liquid crystal occurs under an applied voltage the light shield regions 24, as well as in the transparent region 23. As a result, the beams (a), (b), (c) incident to the viewing angle control element 12 are not affected by the viewing angle control element 12. The beams leave the viewing angle control element 12, retaining their viewing angle characteristics. Thus, the image display operates in wide viewing angle mode where the viewing angle is greater than in narrow viewing angle mode.

Thus, the viewing angle control element 12 of the present embodiment is capable of switching the polymer-dispersed liquid crystal in the liquid crystal layer in the light shield regions 24 between two states through a suitably setting of the voltage applied to the light shield regions 24 in the viewing angle control element 12. Light traveling from the backlight unit 11 and entering the light shield regions 24 in the viewing angle control element 12 is scattered in one of the states and transmitted in the other state. The switching results in a change in the diffusion of the light upon leaving the viewing angle control element 12 and allows for the control of the viewing angle characteristics.

Next, a manufacture method for the viewing angle control element 12 for use in the image display of the present invention will be described. The description is applicable to the arrangements shown in FIGS. 2, 3, 4, and 5. First, transparent electrodes (not shown) are formed of ITO (indium tin oxide) on a lower substrate 22. Here, for convenience, the lower substrate 22 is taken as an example. The upper substrate 21 can be fabricated by the same process as the lower substrate 22.

The transparent electrodes may be patterned. However, non-patterned, flat electrodes are preferred for fabrication purposes. Further, a generic substrate with ITO may also be used. Then, the lower substrate 22 with ITO is, for example, spin-coated or laminated with a photosensitive-acrylic resin material which will produce a negative resist as the pillared transparent resin layer. After being exposed to light using a photo mask, the resin material is then developed in, for example, an aqueous solution of NaOH. Then, a baking step concludes the fabrication of the transparent regions 23 of the pillared transparent resin layer functioning also as spacers. The spacer function of the transparent regions 23 eliminates the need to separately form or spray spacers, facilitating the fabrication process.

After the transparent regions 23 are formed, an alignment film (not shown) is printed or otherwise formed of a polyamic acid on the lower substrate 22. The film is then fired. Further, the film is subjected to rubbing or another alignment step to conclude the fabrication of the lower substrate 22. Electric insulating film may be provided in the gap between the alignment film and the transparent electrodes where necessary.

An edge sealing material 25 is printed or otherwise applied to either the upper substrate 21 or the lower substrate 22. To remove the solvent component from the edge sealing material 25, the substrate is prebaked.

The upper substrate 21 and the lower substrate 22 are then combined. A liquid crystal material is injected through an injection hole (not shown) in the edge sealing material 25. The injection hole is then sealed to conclude the fabrication of the light shield regions 24 made of a liquid crystal layer. The liquid crystal material may be injected not by this dipping method, but by a dispenser method. Specifically, an edge sealing material 25 is applied to one of the substrates without forming an injection hole. After dipping a liquid crystal material within the edge sealing pattern, the substrates 21, 22 are combined to form the liquid crystal layer. These steps conclude the fabrication of the viewing angle control element 12.

The transparent region 23 pattern of the pillared transparent resin layer can be formed by typical photolithography employed in the fabrication process of liquid crystal displays. The viewing angle control element 12 can be fabricated without altering the existing liquid crystal fabrication process at all. Specifically, A fine pattern of the pillared transparent resin layer (transparent regions 23) can be formed with high dimensional precision by typical photolithography. In addition, even if fine patterning of the pillared transparent resin layer is required, there is no need of patterning the transparent electrodes. No block/transmit switching failure occurs due to a broken transparent electrode.

The pillared transparent resin layer may be formed in any given pattern: e.g. stripes (slits), a matrix (of dots), or oblique where openings are formed like steps. Further, since the layer can be formed by photolithography, the layer may be linear, curved, or of any other pattern shape.

EXAMPLES

To illustrate the viewing angle control element 12 of the present invention more specifically, examples of the present invention will be now given. The viewing angle control elements 12 in the examples were fabricated by the following steps. First, a laminator of a negative resist for a thick film (product name: "ASF series" available from Hitachi Chemical Co., Ltd.) was transferred on to the glass substrate 2 provided with ITO (not shown) by high temperature substrate overheat. The laminator was exposed using a photo mask to form a desired pattern of a pillared transparent resin layer for the viewing angle control element 12. Under these circumstances, the laminator was exposed to ultraviolet rays (quantity: 200 mJ), developed for 1 minute in an 2% aqueous solution of NaOH at 30° C., washed, and baked for 40 minutes at 230° C. in a clean oven, to form a stripe pattern of the pillared transparent resin layer measuring 40 μm in thickness and 12 μm in width.

Next, an alignment film of a polyamic acid was formed and baked for 30 minutes at 250° C. in a clean oven. In the case of using a dichroic dye for guest-host mode, the resultant film was subjected to rubbing or another alignment step for homogeneous alignment. In the case of using a polymer-dispersed liquid crystal, no alignment step was conducted. The lower substrate 22 was thus obtained. The upper substrate 21 was obtained by the same process as the lower substrate 22.

Using a screen plate on which a frame-like sealing shape was patterned, the edge sealing material 25 (product name: "XN-21S" available from Mitsui Chemicals, Inc.) was applied to the upper substrate 21. To remove the residual solvent from the sealing material, the substrate 21 was heated at 100° C. for 30 minutes in a clean oven. The upper and lower substrates 21, 22 were then combined and baked at 200° C. for 60 minutes.

A liquid crystal material was injected into the gap between the combined upper and lower substrates 21, 22, to form liquid crystal layer guest-host liquid crystal or polymer-dispersed liquid crystal in the light shield regions 24.

Next, viewing angle characteristics were evaluated of the image displays containing the viewing angle control element 12 formed as above, image displays 13 for displaying images, and backlight units 11. VA-mode active matrix liquid crystal was used as the image display 13. In the examples, transmissive liquid crystal displays were used. Alternatively, light emitting elements, such as plasma displays or EL displays, may be used. When a light emitting element is to be used, there is no need to use a backlight unit 11.

When the image display element 13 is a non-light-emitting display element, such as a liquid crystal display element, it is desirable if a light source is also provided further away from viewer than the viewing angle control element 12 and the image display element 13. Examples of the light source include an area lighting backlight where a cold cathode fluorescent tube or other lamp is placed under the surface of the viewing angle control element 12 or the image display element 13 and an edge lighting backlight where a lamp is placed on an edge of an optical guide.

The viewing angle control element 12 is placed on the viewer side of the image display element 13. A polarizer is provided in the gap between the viewing angle control element 12 and the image display element 13. As mentioned earlier, when the liquid crystal layer of the viewing angle control element 12 is formed of a polymer-dispersed liquid crystal and the image display 13 is a light emitting element, such as an EL element, which requires no polarizer, no polarizer is needed in the gap. Behind the image display element 13 is there provided the backlight unit 11. So, light from the backlight unit 11 is transmitted through the backlight unit 11, the image display 13, and the viewing angle control element 12 in this order.

Here, when the viewing angle control element 12 is used in narrow viewing angle mode, the viewing angle can be set to any given value by means of the thickness D and width L of the pillared transparent resin layer formed in the transparent regions 23, that is, according to the equation:

$$\text{Viewing angle } \theta n = 2 \tan^{-1}(L/D).$$

In the examples, the pillared transparent resin layer is 40 μm thick and 12 μm wide. The setting viewing angle is about 33°.

Table 1 shows the viewing angle characteristics of the image display 13 used alone and actual evaluations of the viewing angle characteristics in wide viewing angle mode and in narrow viewing angle mode when the viewing angle control element 12 is used. At wide viewing angles, both when a guest-host mode is used for the liquid crystal layer and when a polymer-dispersed liquid crystal is used for the liquid crystal layer, Table 1 shows the substantially same characteristics as the viewing angle characteristics of the image display used alone. It would be understood that the wide viewing angle characteristics exhibited by the image display element 13 remain unchanged.

At narrow viewing angles, viewing angle characteristics close to those given by the foregoing equation are obtained in a guest-host mode using dichroic dye. It would be understood that the viewing angle characteristics exhibited by the image display element 13 are changed to narrow viewing angles by the viewing angle control element.

When a polymer-dispersed liquid crystal is used, actually measurements are significantly wide in comparison to the viewing angle characteristics given by the equation. This is due to the forward scattering component toward the viewer side of the polymer-dispersed liquid crystal and can be readily regulated by increasing the liquid crystal layer thickness of the polymer-dispersed liquid crystal layer.

TABLE 1

| Liquid crystal layer mode | Image display element alone | Wide viewing angle | Narrow viewing angle |
|---|---|---|---|
| Guest-host | 150° | 150° | 38° |
| Polymer dispersed | 150° | 150° | 44° |

The foregoing actually measured viewing angle was defined as such an angle range as satisfies $0.1 L (\theta=0°) \leq L (\theta=n) \leq L (\theta=0°)$ where $L (\theta=0°)$ was the brightness normal to the substrate plane of the image display 10 (front brightness), and $L (\theta=n)$ was the brightness in the angle range $\theta n$.

As described in the foregoing, the viewing angle control element of the present invention is a viewing angle control element controlling the viewing angle characteristics of the image display. In the gap between a pair of transparent electrode substrates positioned opposite to each other are there provided two regions: a liquid crystal layer and a pillared transparent resin layer. The liquid crystal layer either absorbs or scatters light from a backlight unit. The pillared transparent resin layer provides a transmission window transmitting light from the backlight unit. The pillared transparent resin layer has a substantially isotropic refractive index and transmits light. The viewing angle characteristics of the image display is controlled through the provision of the two regions. Narrow viewing angles are thus achieved.

In other words, a viewing angle control element and an image display based on the element for viewing angle control are obtained which are capable of setting the viewing angle characteristics of a display-use liquid crystal panel having very wide viewing angle characteristics to a narrow viewing angle of any given viewing angle.

In addition, a viewing-angle-controllable liquid crystal display can be obtained which can display good images without causing deterioration of image quality such as brightness of a display-use liquid crystal display panel in wide viewing angle mode and which can display narrow viewing angle mode.

In addition, in the viewing angle control element of the present invention, the liquid crystal layer as the second regions absorbing light from the backlight unit may be a guest-host liquid crystal containing dichroic dye as above. The viewing angle characteristics of image displays become controllable by efficiently absorbing incident light in a particular viewing angle range.

In addition, in the viewing angle control element of the present invention, the liquid crystal layer as the second regions scattering light from the backlight unit may be a polymer-dispersed liquid crystal as above. The viewing angle characteristics of image displays become controllable by efficiently scattering incident light in a particular viewing angle ranges.

In addition, the liquid crystal layer in the viewing angle control element of the present invention is electrically switchable between a state where the layer either absorbs or scatters light from the backlight unit and a state where the layer transmits the light. Displays are thus produced by the electric switching between a wide viewing angle mode and a narrow viewing angle mode.

In addition, the pillared transparent resin layer formed between a pair of transparent electrode substrates in the viewing angle control element of the present invention is fabricable by conventional photolithography which is a popular manufacturing process for common liquid crystal displays. Therefore, no new process needs be introduced. The layer can be manufactured by a very simple process.

In addition, according to the viewing angle control element of the present invention, there is no particular need to pattern the transparent electrodes on the transparent electrode substrate. No wire breaks occur even when fine barrier patterns are to be formed. Therefore, manufacture yield improves.

Incidentally the viewing angle control element in accordance with the present invention may be arranged so that, in a viewing angle control element controlling the viewing angle characteristics of image displays, so that the viewing angle control element include two regions in a gap between a pair of transparent electrode substrates placed opposite to each other. One of the regions is a liquid crystal layer for absorbing or scattering incident light to the viewing angle control element. The other region is a pillared transparent resin layer having a substantially isotropic refractive index, as a transmission window for transmitting incident light to the viewing angle control element.

According to the arrangement, the viewing angle control element can reduce transmittance for the light passing through the liquid crystal layer through the absorption or scattering of light incident to the viewing angle control element by the liquid crystal layer formed in the viewing angle control element. In addition, the transmission window made of the transparent pillared resin layer transmits, of the incident light to the viewing angle control element, the light substantially parallel to the height direction of the pillared resin layer (normal to the plane of the pair of transparent electrode substrates) without modifying the light at all. Meanwhile, the diffused light incident in such a direction as traversing the pillared resin layer is also incident to the liquid crystal layer, and absorbed or scattered by the liquid crystal layer. So, the light incident in a parallel direction close to the height direction of the pillared resin layer is dominant. Thus, the viewing angle characteristics of the light incident to the viewing angle control element can be changed toward a narrow viewing angle side.

The viewing angle control element in accordance with the present invention, arranged as in the foregoing, may be arranged so that the liquid crystal layer for absorbing light incident to the viewing angle control element is a guest-host liquid crystal containing a dichroic dye.

According to the arrangement, the viewing angle control element of the present invention can absorb polarized light having a polarization plane parallel to the major axes of the dichroic dye molecules because of the dichroic dye added in the liquid crystal. Thus, the viewing angle characteristics of the light incident to the viewing angle control element can be changed toward a narrow viewing angle side.

The viewing angle control element in accordance with the present invention, arranged as in the foregoing, may be arranged so that the liquid crystal layer for scattering light incident to the viewing angle control element is a polymer-dispersed liquid crystal.

According to the arrangement, the viewing angle control element of the present invention can reduce transmittance for light passing through the liquid crystal layer, relative to the transmittance for the light passing through the pillared resin layer, by means of the liquid crystal layer scattering light incident from the viewing angle control element because the viewing angle control element has a liquid crystal layer made of a polymer-dispersed liquid crystal. Thus, the viewing angle characteristics of the light incident to the viewing angle control element can be changed toward a narrow viewing angle side.

The viewing angle control element in accordance with the present invention, arranged as in the foregoing, may be arranged so that the liquid crystal layer in the viewing angle control element is electrically switchable between a state where the layer either absorbs or scatters light incident to the viewing angle control element and a state where the layer transmits the light.

According to the arrangement, the liquid crystal layer in the viewing angle control element of the present invention is formed of a liquid crystal layer containing a dichroic dye. Therefore, the alignment direction of the liquid crystal layer changes according to an electric signal. The alignment direction of the dichroic dye switches in a corresponding manner. The dichroic dye is thus switchable between absorption and transmission for the polarized light. Therefore, the diffusion state of light passing through the viewing angle control element can be electrically switched. Viewing angles are thus controllable.

In addition, the liquid crystal layer in the viewing angle control element of the present invention is formed of a polymer-dispersed liquid crystal. Therefore, the scattering state of the liquid crystal layer changes according to an electric signal. Therefore, the scattering state of the light passing through the viewing angle control element can be electrically switched. Viewing angles are thus controllable.

In addition, the image display in accordance with the present invention contains a backlight unit, an image display element for displaying an image, and the viewing angle control element. The display may be arranged so that the viewing angle of the image display element is controlled using the viewing angle control element.

According to the arrangement, when light from the backlight unit passes through the viewing angle control element, the viewing angle characteristics of the image display element can be electrically switched by electrically controlling the viewing angle characteristics of light incident to the viewing angle control element by applying or not applying an appropriate voltage to the viewing angle control element.

The present invention is also applicable to devices like mobile phones by highly visible displays due to the development of high definition technology in addition to slimness, low weight, and low power consumption.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A viewing angle control element placed between a light source and a viewer to switch an image display between wide viewing angle mode and narrow viewing angle mode, the element comprising:
   first regions having a transmittance T1; and
   second regions capable of switching between a transmittance T2 and a transmittance T3 which is less than T1 and T2,
   each of the first and second regions being positioned opposite to one of pixels, wherein
   said first regions are transparent, composed of a transparent resin layer, said second regions are composed of liquid crystal, and the first and second regions are adjacent to each other alternatively, on a common plane, said element further comprising
   a first substrate and a second substrate, both of which being opposite to the light source, wherein:
   the first and second regions are positioned at positions divided by an interface connecting the first and second substrates, and
   said first and second regions are composed of materials different from each other.

2. The viewing angle control element of claim 1, wherein T1 is equal to T2.

3. The viewing angle control element of claim 1, wherein the second regions achieve the transmittance T3 through absorption.

4. The viewing angle control element of claim 3, wherein the second regions are a guest-host liquid crystal containing a dichroic dye.

5. The viewing angle control element of claim 1, wherein the second regions achieve the transmittance T3 through scattering.

6. The viewing angle control element of claim 5, wherein the second regions are a polymer-dispersed liquid crystal.

7. The viewing angle control element of claim 1, wherein two or more of the first regions are provided at a position opposite to each one of the pixels so that each of the first regions determines a viewing angle and that a sum area of the two or more of the first regions determines brightness.

8. The viewing angle control element of claim 1, wherein the first regions are of a stripe shape.

9. The viewing angle control element of claim 1, wherein the first and second regions are lined up parallel to horizontal lines.

10. The viewing angle control element of claim 9, wherein the first and second regions are lined up both parallel and perpendicular to horizontal lines.

11. An image display operating in wide viewing angle mode and narrow viewing angle mode,
   the display being capable of switching between wide viewing angle mode and narrow viewing angle mode by means of a viewing angle control element placed between a light source and a viewer to switch the image display between wide viewing angle mode and narrow viewing angle mode,
   the element comprising:
   first regions having a transmittance T1; and
   second regions capable of switching between a transmittance T2 and a transmittance T3 which is less than T1 and T2,
   each of the first and second regions being positioned opposite to one of pixels, wherein
   said first regions are transparent, composed of a transparent resin layer, said second regions are composed of liquid crystal, and the first and second regions are adjacent to each other alternatively, on a common plane, said image display further comprising
   a first substrate and a second substrate, both of which being opposite to the light source, wherein:
   the first and second regions are positioned at positions divided by an interface connecting the first and second substrates, and
   said first and second regions are composed of materials different from each other.

* * * * *